United States Patent
Susdorf et al.

[15] 3,654,504
[45] Apr. 4, 1972

[54] BRUSH MECHANISM

[72] Inventors: Robert A. Susdorf; Fredrick J. Armstrong, both of Fort Wayne, Ind.

[73] Assignee: General Electric Company

[22] Filed: Mar. 29, 1971

[21] Appl. No.: 128,873

[52] U.S. Cl. ............................................. 310/239, 310/246
[51] Int. Cl. ........................................................... H02k 13/00
[58] Field of Search ......................... 310/238, 239, 241, 246

[56] References Cited

UNITED STATES PATENTS

| | | | |
|---|---|---|---|
| 2,727,165 | 12/1955 | Schaffer | 310/239 |
| 2,862,123 | 11/1958 | Arsenault et al. | 310/241 |
| 3,159,763 | 12/1964 | Colvill et al. | 310/238 |
| 3,510,709 | 5/1970 | Walker et al. | 310/239 |
| 3,527,971 | 9/1970 | Means | 310/68 D |

Primary Examiner—D. X. Sliney
Attorney—John M. Stoudt, Radford M. Reams, Ralph E. Krisher, Jr., Allard A. Braddock, Frank L. Neuhuaser and Oscar B. Waddell

[57] ABSTRACT

A brush mechanism for a dynamoelectric machine including an insulating mounting plate or yoke having locating means adapted to position two or more brush boxes. Brush boxes are accurately positioned and permanently mounted to the yoke prior to the mounting of the mechanism to the machine. The yoke also includes means for accurately positioning the mechanism on the machine housing. Each brush box is a one piece stamped and formed member fabricated of steel material and includes an integral spring post to which is mounted a spring for biasing the brush against the peripheral surface of the commutator of the machine.

11 Claims, 15 Drawing Figures

Patented April 4, 1972
3,654,504
2 Sheets-Sheet 1
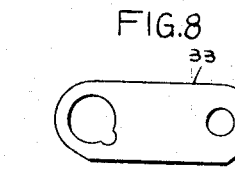
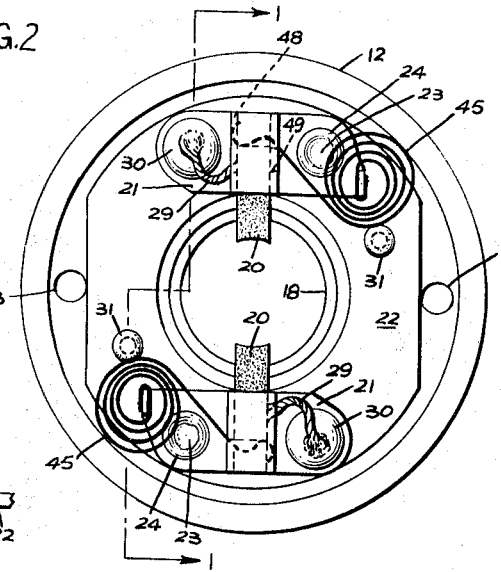
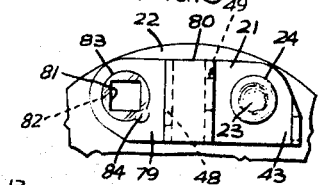
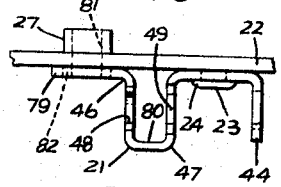
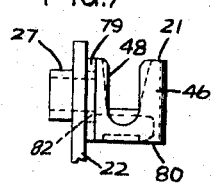
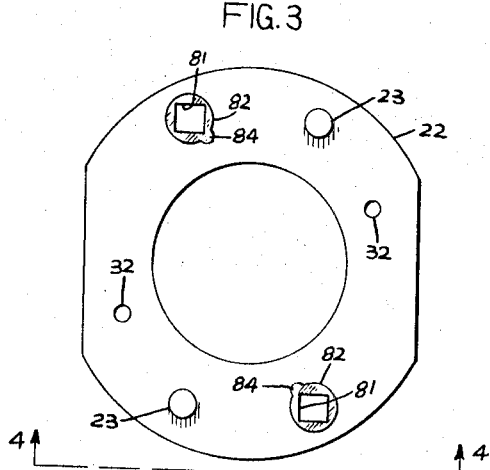
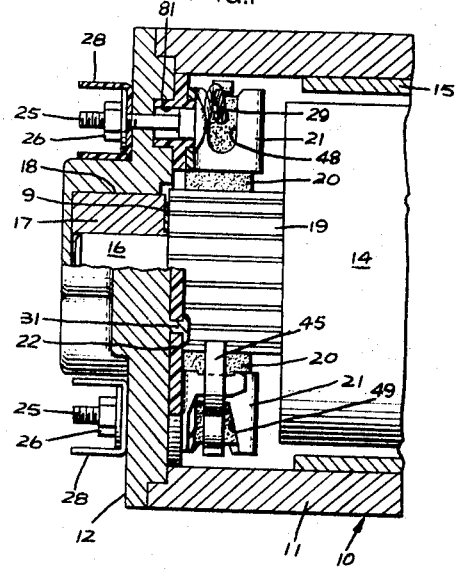
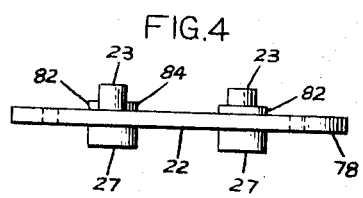
INVENTORS:
Robert A. Susdorf,
Fredrick J. Armstrong,
BY Ralph E. Krisher Jr.
ATTORNEY

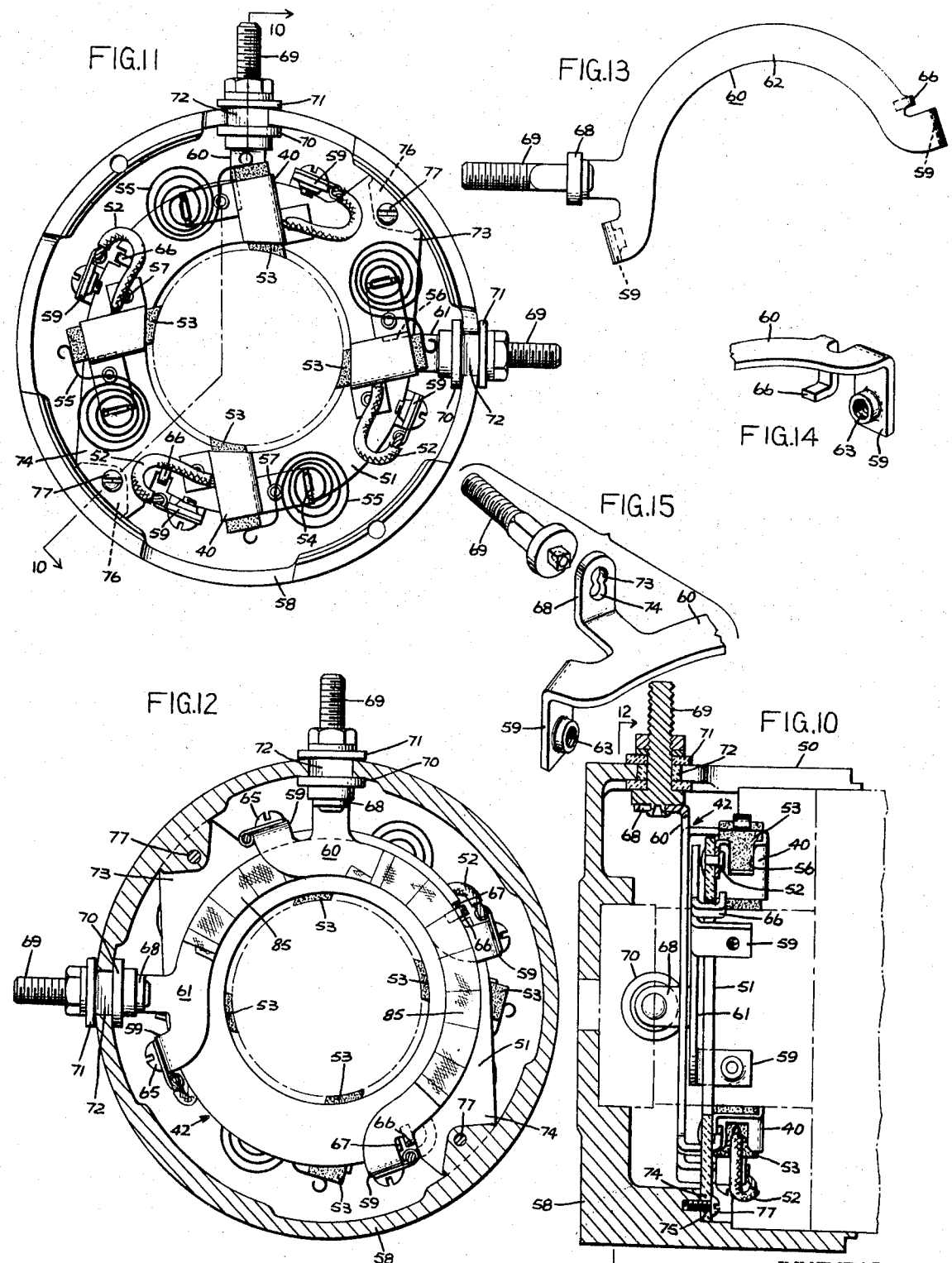

No. 3,654,504

BRUSH MECHANISM

BACKGROUND OF THE INVENTION

The invention described herein relates to dynamoelectric machines having rotatable commutators and more particularly to brush mechanisms and parts thereof for use in such machines wherein spring means are used to bias the brushes against the peripheral surface of the commutator.

In dynamoelectric machines of the kind having a commutator and a plurality of brushes which are biased against the surface thereof, the brushes are conventionally slidably mounted in brush holders which in turn may be mounted to a support plate. A longitudinally coiled spring or other means may be provided for exerting a constant predetermined force on the brush.

The relative position of the brush holders and therefore the carbon brush with respect to the machine commutator is important in order to obtain proper commutation and even brush wear in addition to performance of the other known functions necessary for efficiency in machine operation. Proper alignment of the holders on the machine relative to the magnetic axes of the stator is also important for most efficient operation and to attain the requisite precision of alignment requires the careful attention of the assembler and is a time consuming process that frequently introduces excessive and undesirable labor costs in the manufacturing process. Further, in prior structures where brush holders are arranged to be detachable from a support structure, the aligning process must be repeated each time a brush holder is installed or removed from the machine.

In an effort to simplify alignment procedures, some prior arrangements have utilized alignment slots on the brush holders or yoke to permit axial and transverse adjustment of the brush holders relative to the yoke. With this type of structure, the precision of brush alignment is directly dependent upon the accuracy of the assembler. Furthermore, the means used to clamp the brush holder to the yoke in such structures may become loosened during motor operation or repair with resultant loss of desired brush alignment. Moreover, a connection which is established by bolts or screws, which is often done in such structures, is likely to become loose when the machine is in use, especially if the machine or its parts are subject to vibration. Any loosening of the brush holders is likely to adversely affect operation of the machine. Accordingly, it is desirable to minimize both mechanical and electrical connections established by bolts or screws.

One other approach that has been used has involved the formation of brush holders and supporting plates as one or two piece molded plastic structures. However, suitably heat tolerant plastic materials which are economical to use undergo dimensional changes upon removal from a mold and the desired dimensional tolerances of parts made from such materials, if possible to attain, are expensive to maintain in practice.

Another approach has been to form brush holders and the supporting structure therefor as a brass or aluminum die casting. This approach, while reducing the total number of parts required and yielding desired dimensional accuracies, has been an expensive one and has further required a plurality of mechanisms for each dynamoelectric machine in order to permit the desired mutual electrical isolation between brushes during operation.

With this in mind, it would be desirable to economically overcome the aforedescribed inadequacies and provide a brush mechanism which is capable of permanent accurate alignment with the commutator of a dynamoelectric machine wherein the brush holders are permanently mounted to a supporting yoke thereby permitting preassembly of the brush holders and yoke. In this manner, the entire assembly could be installed without the necessity of an elaborate and time consuming alignment procedure. It also would be desirable to utilize a common fastening means for securing a brush holder to a yoke and for securing the mechanism to a dynamoelectric machine frame structure.

Stiffness in a brush holder is a desirable characteristic since it tends to impede the generation of vibrations and prevents the holder from resonating which in turn may result in brush bounce and arcing during operation. In some prior structures, brush holders are fabricated from aluminum or brass in cast form to provide the strength and rigidity for withstanding rugged use and also obtain a smooth brush supporting surface. In the cast form of brush holder, it is not too difficult to shape the supporting or reaction surface, but the labor and cost of material involved in making such a product is out of proportion to the final product cost. It would thus be desirable to provide a one piece brush holder having desirable structural characteristics such as rigidity and heat tolerance from a readily available material that may be economically fabricated.

Prior constructions have also utilized brass or cast aluminum brush holders in order to avoid corrosion problems which it was believed would cause the brush to "hang up" in the holder. In addition, the material used to fabricate brush holders heretofore have been selected to have good electrical conductivity and have been connected in the motor brush circuit so as to provide a parallel path from the carbon brush to the brush terminal. One of the reasons for this practice has been the presumed need to hold the brush holder at a fixed potential, for example, ground or applied voltage, and eliminate the possibility of establishing a current path from the brush to the holder and back to the brush due to the voltage gradient along the brush. In still other arrangements, expensive connectors have been used to interconnect two brushes.

Accordingly, it is an object of the present invention to provide a new and improved brush mechanism for a dynamoelectric machine that overcomes the above stated problems and provides the desirable features and advantages set out hereinabove.

It is another more specific object of the present invention to provide a brush mechanism arrangement that permits the economical achievement of permanent alignment between a brush and a dynamoelectric machine stationary magnetic structure.

A further object of the present invention is to provide a brush mechanism utilizing an economical to manufacture brush holder susceptible of preassembly with an insulating supporting member or yoke.

It is still another object of the present invention to provide a brush mechanism wherein common fastening means may be utilized to secure together a brush holder and yoke and mount the same to a dynamoelectric machine.

It is yet another object of the present invention to provide an improved rigid electrical crossover arrangement for electrically interconnecting a plurality of brushes of a given brush mechanism.

SUMMARY OF THE INVENTION

In carrying out the invention, in one form thereof, there is provided a brush holder mechanism capable of carrying out various ones of the objects of the invention described above and having the stated advantages. The brush holders are formed from a one piece steel stamping that includes a mounting post for a brush tension spring. Each brush holder is constructed and arranged to be permanently secured to an insulative yoke member which is accurately positioned on the end plate or the machine housing. Mounting means, such as studs are used for mounting the assembly to the housing, are insulated therefrom, and serve as terminal studs for connection to the power leads as well as providing securement between the yoke and brush holders.

In another form of the invention, opposite brush members are interconnected by solid crossover blanks which provide rigid self-supporting members that also may be used to secure the yoke to the end shield or housing of the machine by means of a bolt connection that doubles as a terminal stud. The studs are mounted to outwardly extending ears provided on the crossover blanks which also include inwardly extending ears or tabs for connection of the brush conductors and positioning tabs for locating the blanks on the yoke. The brush conductors may include an insulative wrapper that allow the brush holder to "float" electrically.

The use of steel for brush holders as proposed in the present invention has caused no "hang up" due to rusted or otherwise corroded surfaces. Where high corrosive environments are encountered, brush holders may be coated with an anticorrosive agent to avoid arcing problems. Further, it has been found that brush pigtails may be insulated so that the brush holders "float" electrically so that the brush spring does not carry currents. No problems with arcing between the brushes and holders have been encountered in the use of steel brush holders in accordance with the present invention on dynamoelectric machines.

Still another advantage of the present invention is that stamped steel brush holders provide more design freedom and permit better utilization of brush materials. For example, the stiffness of the stamped steel brush holder enables a deeper brush pigtail slot to be formed than heretofore available for a given thickness of metal so as to permit a deeper spring travel than would be the case for a cast aluminum holder or a less rigid brass holder made from sheet material of the same given thickness. In terms of material utilization and brush life, the deeper slot depth permits greater brush travel and correspondingly increased brush material usage and useful brush life.

BRIEF DESCRIPTION OF THE DRAWINGS

While the specification concludes with claims particularly pointing out and distinctly claiming the subject matter of the invention, it is believed that the invention will be better understood from the following description taken in connection with the accompanying drawings, in which:

FIG. 1 is a fragmentary, sectional view of a portion of a dynamoelectric machine, taken along lines 1—1 of FIG. 2, illustrating the brush holder and rigging assembly of the present invention;

FIG. 2 is an elevational view of the brush mechanism of the present invention showing the mechanism mounted to the internal face of a motor end frame;

FIG. 3 is an elevational view of the insulative yoke of FIG. 1 prior to mounting of brush holders thereon;

FIG. 4 is a bottom plan view of the yoke shown in FIG. 3, taken on the lines 4—4;

FIG. 5 is a view, with parts broken away, showing a brush holder positioned on the yoke shown in FIG. 3;

FIG. 6 is a top plan view of the structure shown in FIG. 5;

FIG. 7 is a side elevational view of the structure shown in FIG. 5;

FIG. 8 is an elevational view of a part that may be assembled with the structure shown in FIG. 5;

FIG. 9 is a view corresponding to FIG. 6 and showing the assembly of the FIG. 8 part with the structure of FIG. 6;

FIG. 10 is a fragmentary, sectional view of a portion of a dynamoelectric machine, taken along lines 10—10 of FIG. 11, illustrating an alternate embodiment of the brush mechanism of the present invention wherein solid crossover members are used for electrically interconnecting a pair of brushes with a power source;

FIG. 11 is an elevational view of the brush mechanism of the present invention, showing the mechanism mounted to the end frame of a dynamoelectric machine;

FIG. 12 is an elevational view of the brush holder and rigging assembly taken along lines 12—12 of FIG. 10, assuming FIG. 10 to be shown in full;

FIG. 13 is a detail plan view of one of the crossover members and studs shown in FIGS. 10–12;

FIG. 14 is an enlarged perspective view of one end of the structure shown in FIG. 13; and FIG. 15 is an enlarged exploded perspective view of the other end of the structure shown in FIG. 13.

DESCRIPTION OF THE PREFERRED EMBODIMENTS

Referring now to the drawings, wherein like reference characters designate like or corresponding parts throughout the several views, there is shown in FIG. 1 parts of one end of a dynamoelectric machine generally designated by reference numeral 10. The dynamoelectric machine may be a conventional DC motor having a tubular frame 11 and a cover or end frame 12 attached to the open end of the tubular frame by not shown through bolts in a conventional manner that pass through the openings 13 in the end frame.

The interior of the housing accommodates an armature or rotor 14 which is rotatable between a field structure 15 disposed thereabout. Field structure 15 is conventional and may be a permanent magnet field as shown or may include windings which would be connected during assembly of the machine to terminal posts leading to the exterior of the housing in a well-known manner.

Shaft 16 of the armature is journaled in sleeve bearing 17 within a recessed portion or cavity 18 provided in end frame 12. Shaft 16 of the armature carries a commutator 19, the peripheral surface of which cooperates with equidistant radially extended brushes 20 slidably mounted in brush holders 21.

Each brush holder is positioned on and attached to an insulative support member or yoke 22 which is in turn fastened to the end frame 12. A thrust washer 9 may be provided between the bearing and rotor structure. In one form thereof, yoke 22 is preferably fabricated from a thermoplastic material by molding and includes on one face thereof at least one upstanding post 23 for each brush holder that is used for permanently mounting the associated brush holder to the yoke.

To mount the brush holder to the yoke, one side arm of the brush holder is slipped over the upstanding mounting post 23 which is thereafter deformed by ultrasonic welding or swagging as shown at 24 in FIGS. 2, 5, 6 and 9 so as to secure that side of the brush holder to the yoke. The other side arm of the brush holder is secured by a carriage bolt 25, the shank of which passes through end frame 12 and suitably held fast by locking nut 26. Advantageously, bolt 25 is insulated from the end shield by virtue of a bushing 27 provided on the face 78 of yoke 22, opposite the face on which posts 23 are formed. Bushings 27 are adapted to be received in a correspondingly shaped opening in end frame 12.

Although the brush holders 21 are stamped and then formed from steel, and provide rigid brush mounting means as will be described in more detail hereinafter, we have found that sufficient stress may be transmitted along arm 79 of the holders to distort the brush receiving section 80 of the holders. More specifically, during assembly when the nuts 26 are torqued down on the bolts or studs 25, torque is transmitted through the heads of the bolts 25 to the arms 79. This occurs, somewhat surprisingly, even though a square bolt receiving channel 81 is provided in the yoke 22 for cooperation with a square shoulder on the bolts 25.

When such torque is transmitted to sections 80 of the brush holders, the sections 80 are distorted a sufficient amount that the brushes 20 actually bind against the internal walls of the sections 80. We have found that this problem is obviated by providing positive interlocking means between the yoke 22 and holders 21. In the preferred form, this interlocking means includes an irregular, i.e., noncircular shaped boss 82 on the yoke 22 which interfits with a correspondingly shaped opening 83 formed in the arm 79 of the brush holder. With this arrangement, when the bolts 25 are subjected to a torque, the brush holders do not distort objectionable amounts. Although the bosses 82 have been illustrated as being irregular in shape by virtue of the provision of tabs 84, it will be understood that the bosses could as well be hexagonal, elliptical, or other shapes in order to serve the same purpose.

An insulative washer 28 between the outside face of the end frame 12 and the fastening nut 26 completes the electrical isolation of the carriage bolt 25 from the end frame so that electrical connection to external power leads (not shown)

may be made directly through bolt 25. Power to brushes 20 is carried by means of a brush conductor or pigtail 29 which has its free end and electrically connected to the head 30 of carriage bolt 25 by welding, soldering, brazing, or any other suitable means for making electrical connections.

At least rough alignment of the assembly to a machine may be effected by casting the end frame 12 with one or more locating pins 31 adapted to be received in positioning holes 32 provided in the yoke and headed like a rivet. In a preferred form, the holes 32 are at least slightly oversized relative to the pins 31 and the precise alignment of the brush mechanism is determined by the channels or bosses 27 on the yoke and bolt 25. Thus, the means used to secure the brush holder 21 to the yoke 22 also secures the holder-yoke assembly to the end frame 12. In addition, even if the dimensions of various yokes 22 should vary slightly due to molding process changes, etc. during manufacture of the yoke, these variations will not affect the actual alignment of the brushes 20 relative to the magnetic field structure of the motor 10, since the openings for the bolts 25 in the end frame 12 may be precisely maintained, the bolts 25 determine the exact position of the brush holders and brushes relative to the end frame 12, and the end frame may be designed to precisely interfit in a desired manner with the shell 11 of the motor 10.

Each brush holder 21 is a one piece formed steel stamping having a centrally disposed, three sided, open ended channel 81 within which is slidably received a carbon brush 20. Extending from opposite sides of the channel are a pair of flat arm or side members 79, 43, each of which includes a mounting hole through which the carriage bolt 25 and mounting post or boss 27 pass for fastening of the holder to the yoke. One side member 43 is bent at 90° angle to provide a spring post 44 to which a coiled spring 45 is secured.

Opposite sides 46 and 47 of the open ended channel 81 are provided with a relatively deep slot 48 and 49, respectively, for accommodation of pigtail 29 and the free end of spring 45 respectively. Spring 45 effectively urges the associated brush 20 into engagement with the peripheral surface of the commutator 19 until such time as it bears against the bottom of the slot 49.

As most clearly shown in FIG. 1, the slots extend a distance greater than one-half the height of the channel section. The length of the slot is somewhat dependent on the thickness of material used, but it can be stated that as compared to bronze or aluminum of the same thickness, the stamped steel construction enables a deeper slot to be used. This permits greater spring travel and brush travel resulting in a correspondingly increase in brush life. This construction results in a simple and inexpensive rigid brush mechanism that may be simply and accurately positioned with respect to the commutator segments so as to provide optimum commutation and maximum brush life.

With reference to FIGS. 8 and 9, it will now be appreciated that, if desired, a backing plate 33 may be assembled between the arms 79, 43 of the brush holder and yoke 22. The plate 33, made of high temperature resistance material, is used when relatively low temperature resistance materials are used in the formation of yoke 22 in order to provide a channel along which a brush is freely slidable. The very high temperature of the brushes 20 during prolonged motor operation can deleteriously affect materials such as glass filled nylon such that a brush will not slide freely therealong. Accordingly, the plate 33 is preferably formed of steel or some other high heat resistant material.

Referring now to FIGS. 10-15, there is illustrated another exemplification of a brush mechanism. This exemplification is particularly adapted for use with a four-pole dynamoelectric machine, but it will be readily apparent that it may be quickly and economically adapted for application in machines having more or less than four poles.

As most clearly shown in FIG. 11, the one piece stamped and formed steel brush holders 40 are similar to the holders 21 shown in FIGS. 1-9, and the brush mechanism 42 is mounted to form part of motor 50, the rotor of which is illustrated by broken lines. Therefore, a further detailed description of these parts will not be made. The brush mechanism 42 of FIGS. 10-12 differs from the construction shown in FIGS. 1 and 2 in several respects. For example, the yoke 51 is a member stamped from a sheet of suitable insulating material, such as glass fiber reinforced board. In addition, the brush holders 40 are secured to the yoke 51 by conventional fastening means illustrated as steel rivets 57. Furthermore, the brush shunts or pigtails 52 are electrically connected to an external terminal by interconnecting means to be described in more detail hereinafter.

As best shown in FIGS. 10, 11 and 12, pairs of identical brush holders 40 are oppositely disposed from each other. Each holder includes a brush 53 slidably mounted within the holder. The extending side arms of the holders are permanently secured to the insulative yoke 51 by riveting as previously described. Each holder includes an integral upstanding spring post 54 to which is secured one end of brush biasing spring 55, the free end of which may extend through spring slot 56 in the holder to urge the brush against the peripherial surface of the commutator as the brush wears down. The brush shunts 52 are connected to terminals 59.

As clearly shown in FIGS. 11 and 12, each pair of oppositely disposed brushes is interconnected by interconnecting means that include solid crossover members 60 and 61 which are disposed on the face of the yoke opposite the yoke face to which the brusher holders are mounted. Both members 60 and 61 are identical in construction as best shown in FIGS. 13, 14 and 15. The members 60, 61 each include a central arm section 62, opposite ends of which are provided with terminal tabs or ears 59. Each tab 59 extends substantially at a right angle with respect to the central arm section 62 and is adapted to pass over the yoke 51 for connection with an associated brush shunt 52. To this end, connection of the brush shunts to the tabs 65, which thus constitute termination means, is accomplished by providing a threaded hole 63 in the tab 65 which threadingly receives the screws 65. Thus the threaded hole 63 also constitutes part of the termination means. Each crossover 60, 61 also includes a positioning tab or hook 66 that is located in an associated locating notch 67 provided in the yoke 51. Also provided is a tab 68 that supports a screw terminal 69 for electrical connection of the termination means to not shown external power leads.

Tab 68 is bent substantially at a right angle to include an arm section that extends in a direction opposite to that of tabs 63 and 64, that is, away from the yoke in its mounted position as most clearly shown in FIG. 15.

The heads of the screw terminals or studs 69 are secured to tabs 68 by upsetting, riveting, welding, or the like to form a terminal that allows interconnection to external power leads and which also doubles as a physical mounting connection to end frame 58. To this end, terminal studs 69 pass through cooperating openings in the end shield. Stud 69 are insulated from the housing by means of insulative washers 70 and 71, and a central bushing 72, which may be fabricated from the excess material remaining from the stamping of the yoke 51.

Because the crossover blanks are identical and adapted to be positioned one above the other in spaced relationship, means must be provided to position the blank 60, as viewed in FIG. 12, further from the plane of the yoke 51 than the blank 61. To do this, the mounting openings in the end frame 58 for the studs 69 are located a uniform distance from the yoke 51, as viewed in FIG. 10. However, the studs 69 are actually mounted to the crossovers 60, 61 different distances from the plane of the central arm 62 of each crossover. To this end, tabs 68 are provided with a pair of intersecting holes 73 and 74. Crossover terminal stud subassemblies are then formed by locating the terminal or stud 69 at the center of the inward or outward hole, 73 or 74 respectively, depending on whether the crossover blank is to be mounted adjacent the yoke (blank 61 as viewed in FIG. 12) or to the outside of the inward crossover blank (blank 60 as viewed in FIG. 12).

As should be apparent, the crossover assembly is a rigid self-supporting arrangement that assists in securing yoke 51 to the end shield 12, along with screws 77. In their mounted position, crossover blanks 60 and 61 are spaced from each other; however, as a further protection against shorting, the adjacent areas of the blanks may be wrapped with an insulative tape 84 or coated with some other suitable insulative coating.

In the embodiment illustrated in FIGS. 10–12, yoke 51 is preferably fabricated from a glass filled thermosetting material and is stamped to provide a substantially circular blank member having outwardly extending ears 73, 74 aligned opposite each other. Each ear includes an accurately positioned mounting hole 75 by which the yoke is secured to an appropriate mounting surface 76 provided on the end frame 58. The yoke blank is stamped out in the center so as to allow the yoke to be slipped over the commutator of the rotor.

It should be evident that, by virtue of the fabricating process, parts can be speedily and economically made from inexpensive materials and permanently secured together in precise alignment.

A life test performed on the brush mechanism 42 as illustrated in FIGS. 10–12 using untreated steel brush holders showed no adverse affects on the brush holder. The test lasted for 2½ months. During this time, a motor using the mechanism was operated for 8 hours per day and was off for 16 hours. Motor environment was held at 90° F., 100 percent relative humidity. At the end of the test, the brush holders were rusted, as might be expected, but contrary to all expectations, no "hang up" due to rusted or otherwise corroded brush holder surfaces was encountered.

Similar tests were conducted with similar units with the exception that the steel brush holders were coated with zinc phosphate as a means of rust protection. Observable rusting was less than in the test conducted with untreated brush holders, and again no undesirable brush action was observed. Obviously, many modifications and variations will suggest themselves to those skilled in the art and it is intended by the appended claims to cover all such modifications and variations which fall within the true spirit and scope of the invention.

In both illustrated embodiments, the brush holders comprise a formed one piece steel stamping and this permits the arrangement of enlarged first and second slots in the brush holder for a given preselected thickness of steel which, as will be appreciated, also establishes the thickness of the walls of the channel in which the brush is freely slidable.

For example, when the brush holder 21 was formed of 0.030 of an inch rolled steel, the depth of the slot 49 for accommodating the springs 45 was about 0.374 of an inch deep, about 0.400 of an inch wide at the open end thereof, and about 0.145 of an inch wide at the closed end thereof. This slot was formed in the wall 47 which had a dimension, in the direction of brush travel, of about 0.562 of an inch and a transverse dimension, as viewed in FIGS. 1, 7 and 9, of about 0.478 of an inch.

The wall 48 also had overall dimensions of about 0.562 by 0.478 inches, and the slot 48 formed therein for accommodating the brush shunts 29 had a depth of about 0.457 of an inch and a width of about 0.220 of an inch.

It will be understood that, if the brush holder were formed as a cast structure, as heretofore, with slots the size of the slots 48, 49, the wall thickness of the cast (or molded) structure would be much greater than in the case of the brush holders 21.

On the other hand, if the walls in brush holders of the type known heretofore were formed to be only 0.030 of an inch thick, any slots formed therein would be smaller than the slots 48, 49.

As previously mentioned, when the yoke 22 is formed of glass filled nylon type material, the temperatures encountered during operation of motor 10 are such that carbon brushes do not slide freely thereacross. Accordingly, the plate 33 is utilized. However, other materials might be used (to form the yoke 22) which would have high temperature characteristics such that the plate 33 would not be needed in order to provide a channel along which the brushes 20 are freely slidable.

For completeness of description, it should again be emphasized that interconnections of the brush shunt means to the termination means of FIGS. 1 and 2, i.e., the screws 25, may be accomplished by any suitable connector means, including welding, soldering, or brazing the shunts to the head of the screw as shown at 30, and that this same technique may be followed to insure a good connection between the studs 69 and crossovers 60, 61 shown in FIG. 12. The connection of the brush shunts 52 to the termination means of FIGS. 10–15 is accomplished however, as previously mentioned, by a connector means or connector in the form of a screw and threaded hole, as shown at 65.

While in accordance with the Patent Statutes we have described what at present are considered to be the preferred embodiments of our invention, it will be obvious to those skilled in the art that numerous changes and modifications may be made therein within the true spirit and scope of the invention.

What we claim as new and desire to secure by Letters Patent of the United States is:

1. A dynamoelectric machine comprising a stationary structure, a rotor rotatably mounted within the stationary structure, and a commutator mounted on the rotor; and a brush mechanism comprising a mounting plate, a plurality of brushes for engaging the peripheral surface of the commutator at spaced apart positions and freely movable radially toward the axis of rotation of the rotor, termination means for electrical interconnection with at least one of the brushes, a brush shunt connected to each one of the brushes and with at least one of the brush shunts being electrically connected by connector means to the termination means, a brush holder supporting each brush; a spring for urging each brush against the commutator, and means for fixedly securing each brush holder to the mounting plate whereby each of the brush holders establish a channel along which a brush is freely slidable, the brush holders each having walls defining at least part of the channel for slidingly receiving the associated brush, said walls having a preselected thickness, a first slot formed in each brush holder for accommodating a brush shunt, a second slot in each brush holder for accommodating a brush biasing spring, and each brush holder comprising a formed one piece steel stamping thereby to permit the arrangement of enlarged first and second slots for the preselected thickness of the walls of the channel.

2. The structure of claim 1 wherein the means for fixedly securing each brush holder includes a terminal for electrically connecting the brush to a power lead external of the machine and for securing the brush mechanism to the stationary structure, and said means for fixedly securing each brush holder further comprise an irregular surface on the mounting plate that interfits with the brush holder and prevents distortion of the brush holder when a torque is applied thereto.

3. A dynamoelectric machine comprising a stationary structure; a rotor rotatably mounted within the stationary structure, and a commutator mounted on the rotor; and a brush mechanism comprising a yoke, a plurality of brushes for engaging the peripheral surface of the commutator at spaced apart positions and freely movable radially toward the axis of rotation of the rotor, termination means for electrical interconnection with at least one brush, brush shunts electrically connected to each brush and at least one of the brush shunts being electrically connected by connector means to the termination means, a brush holder supporting each brush, a spring for urging each brush against the commutator, and means for fixedly securing each brush holder to the yoke whereby each of the brush holders establish a channel along which a brush is freely slidable, the brush holders each defining walls of the channel having a preselected thickness for slidingly receiving the associated brush, a first slot accommodating a brush conductor connected to the associated brush, and a second slot for accommodating a brush biasing spring, said means for fixedly securing each brush holder including a terminal for electrically connecting the brush to a power lead external of the machine and for securing the brush mechanism to the stationary structure, and further including an irregular mounting surface on the mounting plate that interfits with the brush holder and prevents distortion of the brush holder when a torque is applied thereto.

4. The structure of claim 1 wherein the brush mechanism further comprises a pair of substantially similar solid crossover members, each of said crossover members electrically interconnecting a different pair of brushes.

5. The structure of claim 4, wherein each crossover member includes a generally planar central arm section and means for locating a terminal member relative to the plane of the central arm section at different preselected distances, whereby a single crossover blank may be used to form distinguishable crossover members.

6. The structure of claim 4 wherein said mounting plate comprises an insulative yoke including means for positioning each said crossover member relative thereto, each said crossover member including a tab cooperatively associated with said positioning means for locating the position of said crossover members with respect to said yoke.

7. A brush mechanism for a dynamoelectric machine; said mechanism comprising: an insulative yoke; at least two brushes supported at spaced apart positions on the yoke and freely slidable in a predetermined direction relative thereto; termination means for electrical connection with at least one brush; a brush shunt connected to each brush with at least one of the brush shunts being connected by connector means to the termination means; a brush holder supporting each brush; a spring for urging each brush in the predetermined direction; and means for fixedly securing each brush holder to the yoke whereby each of the brush holders establish a channel along which a brush is freely slidable; the brush holders each defining walls, having a preselected thickness, of the channel for slidingly receiving the associated brush; a first slot formed in one of the walls for accommodating a brush shunt connected to the associated brush, and a second slot for accommodating a brush biasing spring, and each brush holder comprising a formed one piece steel stamping thereby to permit the arrangement of enlarged first and second slots for the preselected thickness of the walls of the channel.

8. The brush mechanism as set forth in claim 7 wherein the yoke comprises at least one post formed in the yoke.

9. The brush mechanism as set forth in claim 7 wherein a plurality of prepositioned brush holder mounting holes are provided in the yoke for positioning the holders on the yoke.

10. The brush mechanism as set forth in claim 7 wherein said brush holder is provided with a rust resistant coating.

11. The brush mechanism as set forth in claim 7 including at least four radially spaced brush holders supporting two sets of oppositely facing brushes, means for electrically interconnecting the brushes of each set, each of said means comprising a solid crossover conductor, a first tab on said crossover conductor for supporting a terminal stud and a second tab on said crossover conductor for locating said crossover conductor with respect to said yoke, said first tab including means for selectively positioning a conductive terminal stud relative to the crossover conductor.

* * * * *